(12) United States Patent
Chang et al.

(10) Patent No.: US 7,738,727 B2
(45) Date of Patent: Jun. 15, 2010

(54) METHOD OF PROCESSING BRIGHTNESS OF AN IMAGE AND RELATED DEVICE

(75) Inventors: Rei-Hong Chang, Hsin-Chu (TW); Ming-Chang Liu, Chang-Hua Hsien (TW); Fang-Mei Lu, Hsin-Chu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 975 days.

(21) Appl. No.: 11/464,483

(22) Filed: Aug. 14, 2006

(65) Prior Publication Data

US 2007/0223814 A1 Sep. 27, 2007

(30) Foreign Application Priority Data

Mar. 23, 2006 (TW) .............................. 95110127 A

(51) Int. Cl.
*G06K 9/36* (2006.01)
(52) U.S. Cl. .................. 382/274; 382/260; 382/275; 358/3.26; 358/3.27
(58) Field of Classification Search .......... 382/260, 382/274, 275; 358/3.26, 3.27, 463
See application file for complete search history.

(56) References Cited

U.S. PATENT DOCUMENTS

| 6,148,103 | A | 11/2000 | Nenonen | |
|---|---|---|---|---|
| 6,163,621 | A | 12/2000 | Paik | |
| 6,377,702 | B1 | 4/2002 | Cooper | |
| 6,539,106 | B1 * | 3/2003 | Gallarda et al. | 382/149 |
| 6,556,721 | B1 * | 4/2003 | Wang et al. | 382/282 |
| 6,606,744 | B1 * | 8/2003 | Mikurak | 717/174 |
| 6,987,534 | B1 * | 1/2006 | Seta | 348/229.1 |
| 6,993,185 | B2 * | 1/2006 | Guo et al. | 382/176 |

FOREIGN PATENT DOCUMENTS

| EP | 0 576 003 A1 | 12/1993 |
|---|---|---|
| JP | 96958 | 1/1997 |

\* cited by examiner

*Primary Examiner*—Yosef Kassa
(74) *Attorney, Agent, or Firm*—Winston Hsu

(57) ABSTRACT

Brightness values of image frames are collected and counted to form a brightness distribution. The brightness distribution of the image frames is compared with predetermined brightness distributions. Brightness values of all pixels of successive image frames are adjusted according to a result of the comparison, so as to improve image contrast.

12 Claims, 10 Drawing Sheets

METHOD OF PROCESSING BRIGHTNESS OF AN IMAGE AND RELATED DEVICE

BACKGROUND OF THE INVENTION

1. Field of the Invention

The present invention relates to image processing, and more particularly, the present invention teaches a method and related device for improving a contrast of an image.

2. Description of the Prior Art

Images of higher contrast are more acceptable to the human eye when it comes to images displayed by a display device or a TV. Thus brightness of images is specifically dealt with during processing, in order to avoid images that are too dark or too bright, among other image display phenomena.

Please refer to FIG. 1. FIG. 1 is a block diagram of an image processing device 4 of the prior art. The image processing device 4 can adjust brightness values for pixels in an image. The image processing device 4 comprises a brightness analysis unit 42, a normal brightness table 41, a brightness-increasing table 47, a brightness-decreasing table 43, a brightness-dispersing table 45, and a brightness gain unit 44. The brightness analysis unit 42 is used for analyzing a distribution of the brightness values for all pixels in the image. The brightness gain unit 44 selects a brightness table from a plurality of brightness tables in accordance with the brightness distribution and adjusts the brightness values of all the pixels in the image.

For example, the brightness analysis unit 42 divides a range of brightness values into three regions: a high brightness region, a mid brightness region, and a low brightness region. A brightness distribution of the image is analyzed according to a distribution among these three brightness regions.

Assume brightness values of pixels in the image analyzed by the brightness analysis unit 42 are mostly in the mid brightness range, indicating a lack of contrast. Therefore, the brightness gain unit 44 selects the brightness-dispersing table 45 according to the analyzed result, and a low brightness region of the image is darkened whilst a high brightness region is brightened. Hence the image has a better contrast. All pixels in the low brightness region are adjusted by a same degree of adjustment, and likewise all pixels in the high brightness region are adjusted by the same degree of adjustment.

Assume that brightness values of pixels of the image analyzed by the brightness analysis unit 42 are mostly in the high brightness range, indicating that the image is too bright. Therefore, the brightness gain unit 44 selects the brightness-decreasing table 43, so that all pixels in the image are adjusted down to have lower brightness values. The brightness values of all pixels are adjusted by the same degree of adjustment.

Assume that brightness values of pixels of the image analyzed by the brightness analysis unit 42 are mostly in the low brightness range, indicating that the image is too dark. Therefore, the brightness gain unit 44 selects the brightness-increasing table 47, so that all pixels in the image are adjusted up to have higher brightness values. The brightness values of all pixels are adjusted by the same degree of adjustment.

Assuming the image analyzed by the analysis unit 42 is normal, the brightness gain unit 44 selects the normal brightness table 41, and leaves the brightness of all pixels unadjusted.

However, only three characteristics are available for analyzing an image in the prior art: a dark image, a bright image, and an image with brightness concentration in the mid brightness range. These three characteristics cannot cover every situation of the image.

SUMMARY OF THE INVENTION

A claimed method of processing brightness of an image includes analyzing brightness values of a plurality of pixels to generate a brightness distribution of the pixels, and determining whether a difference between the brightness distribution of the pixels and a predetermined brightness distribution is within a predetermined range. If the difference between the brightness distribution of the pixels and the predetermined brightness distribution is within the predetermined range, brightness values of pixels of an upcoming image are adjusted according to a transformation rule corresponding to the predetermined brightness distribution.

These and other objectives of the present invention will no doubt become obvious to those of ordinary skill in the art after reading the following detailed description of the preferred embodiment that is illustrated in the various figures and drawings.

DETAILED DESCRIPTION

The present invention compares a brightness distribution of an image with a plurality of predetermined brightness distributions, in order to select a brightness adjustment function and hence improve image contrast.

Figure 1:
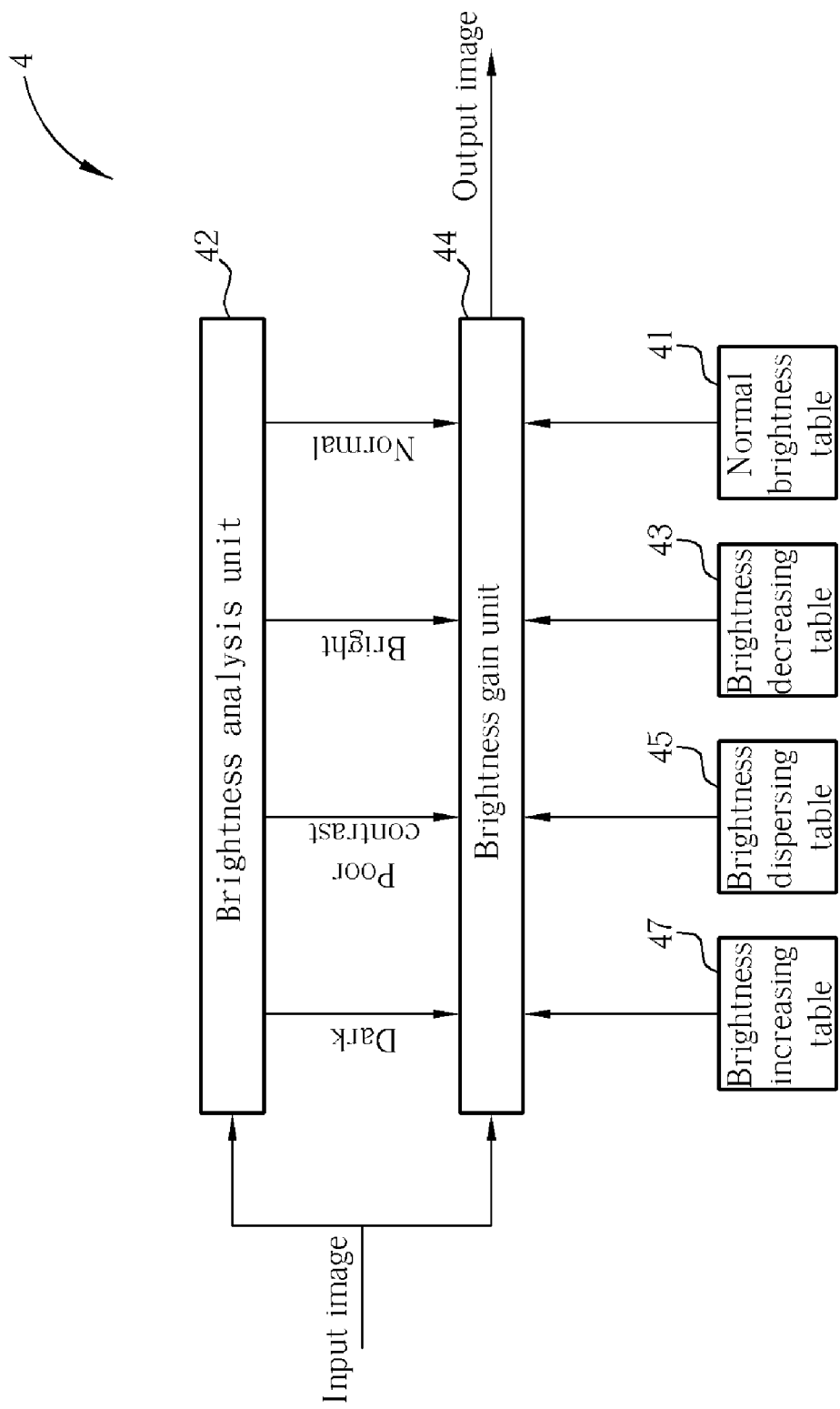
FIG. 1 is a block diagram of an image processing device according to the prior art.
Figure 2:
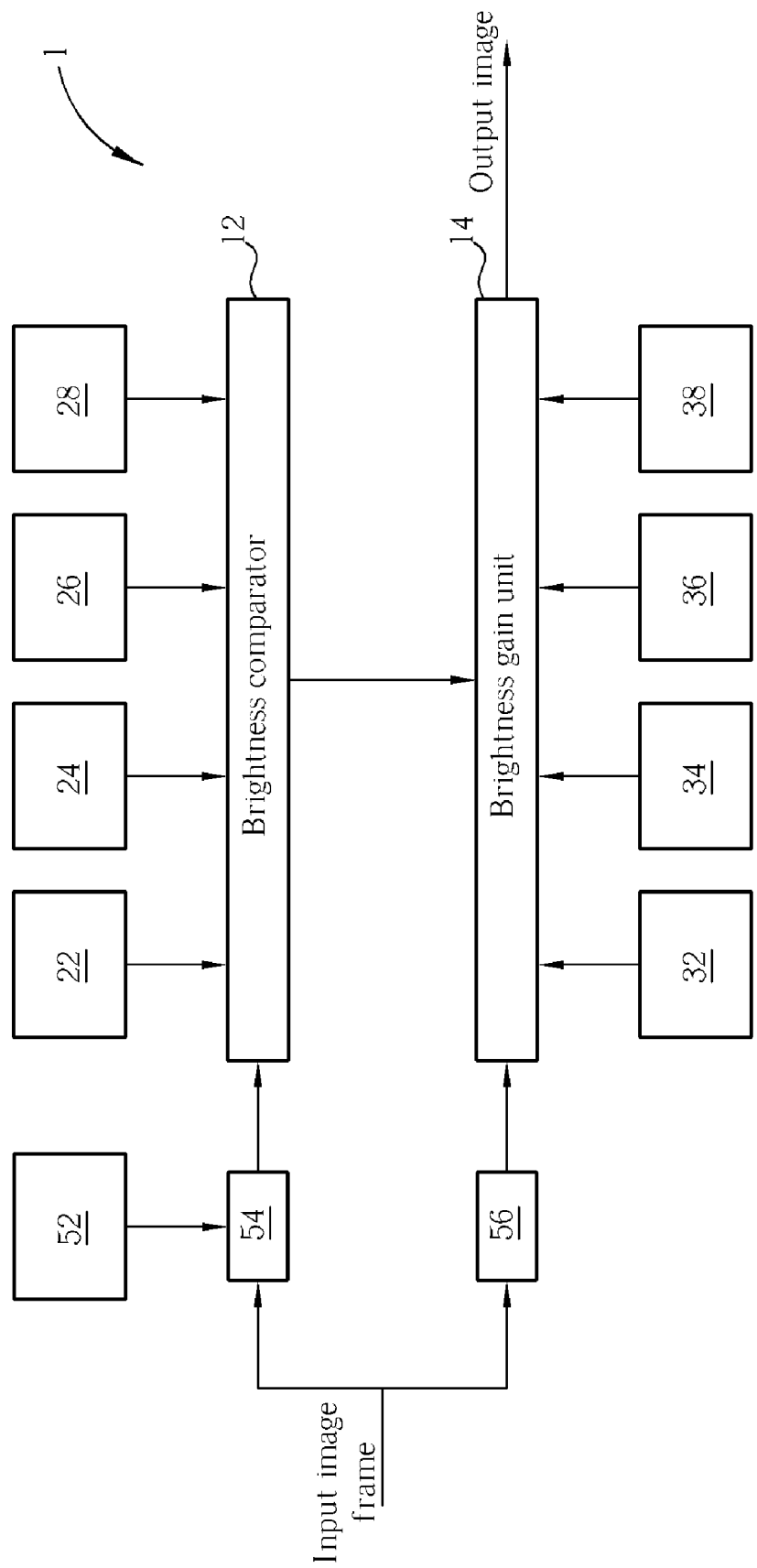
FIG. 2 is a block diagram of an image processing device according to the present invention.

Please refer to FIG. 2. FIG. 2 is a block diagram of an image processing device 1 of the present invention. The image processing device comprises a brightness comparator 12, a brightness gain unit 14, a timing accumulating memory unit 52, a brightness accumulating memory unit 54, a linear buffering memory unit 56, a plurality of predetermined brightness distributions 22, 24, 26, and 28, and corresponding functions 32, 34, 36, and 38 for brightness adjustments. Since a monitor displays the image using row scanning, the linear buffering memory 56 is used to store image information of each row of consecutive image frames temporarily.

The brightness accumulating memory unit 54 receives an image frame and collects data on brightness values of a plurality of pixels in the image frame to produce a brightness distribution of the image frame. Thereafter, the brightness comparator 12 compares the brightness distribution produced by the brightness accumulating memory unit 54 and the predetermined brightness distribution. In this embodiment, the image processing device 1 comprises four predetermined brightness distributions 22, 24, 26, and 28. The brightness comparing unit 12 compares the brightness distribution of the image frame with the predetermined brightness distributions 22, 24, 26, and 28. If the brightness distribution of the image frame is similar to one of the predetermined brightness distributions 22, 24, 26, and 28, then the brightness gain unit 14 adjusts the brightness value of each pixel for image frames to be received.

In general, display devices output image frames at a speed of 30 image frames per second (FPS), therefore the image processing device 1 continuously gathers data and compares brightness distributions. If another of the preset distributions better matches the brightness distribution of the current image frame, then the adjustment function corresponding to the preset distribution that better matches the brightness distribution of the current image frame is adopted, but otherwise the previous adjustment function is used.

Another case may arise wherein the comparator 12 shows that the brightness distribution of the image frame is not similar to any of the predetermined brightness distributions 22, 24, 26, and 28. In such a case, the brightness values of image frames received later are not adjusted or are adjusted in accordance with the brightness adjustment function determined earlier.

When the comparing result shows that the brightness distribution of the image frame is similar to one of the predetermined brightness distributions 22, 24, 26, and 28, the brightness gain unit 14 selects one of the corresponding brightness adjustment functions 32, 34, 36, and 38 according to a control signal of the brightness comparator 12. The brightness adjustment functions 32, 34, 36, and 38 correspond to the predetermined brightness distributions 22, 24, 26, and 28, respectively.

The brightness accumulating memory unit 54 collects data on brightness values of all pixels in a single image frame, or brightness values of all pixels in a plurality of consecutive image frames. The timing accumulating memory unit 52 is used for controlling a number of image frames that the brightness accumulating memory unit 54 collects the data on brightness values for.

Taking a 1024×768 image frame and a design with 8 brightness regions for brightness distributions as an example, please refer to FIGS. 3-6, which represent the predetermined brightness distributions 22, 24, 26, and 28 respectively. The brightness distributions 22, 24, 26, and 28 are divided into 8 brightness regions with a vertical axis representing a number of pixels and a horizontal axis representing brightness values. The predetermined brightness distribution 22 represents that brightness of most pixels fall within dark regions (<127). The predetermined brightness distribution 24 represents that brightness of pixels is concentrated in an extremely low brightness range and an extremely high brightness range. The predetermined brightness distributions 26 and 28 represent that brightness of pixels are concentrated in intermediate brightness regions. The types of brightness distributions and the number of brightness regions can be adjusted to meet various design requirements, for example, higher brightness distribution in two specific regions or in one specific region.

Figure 7:
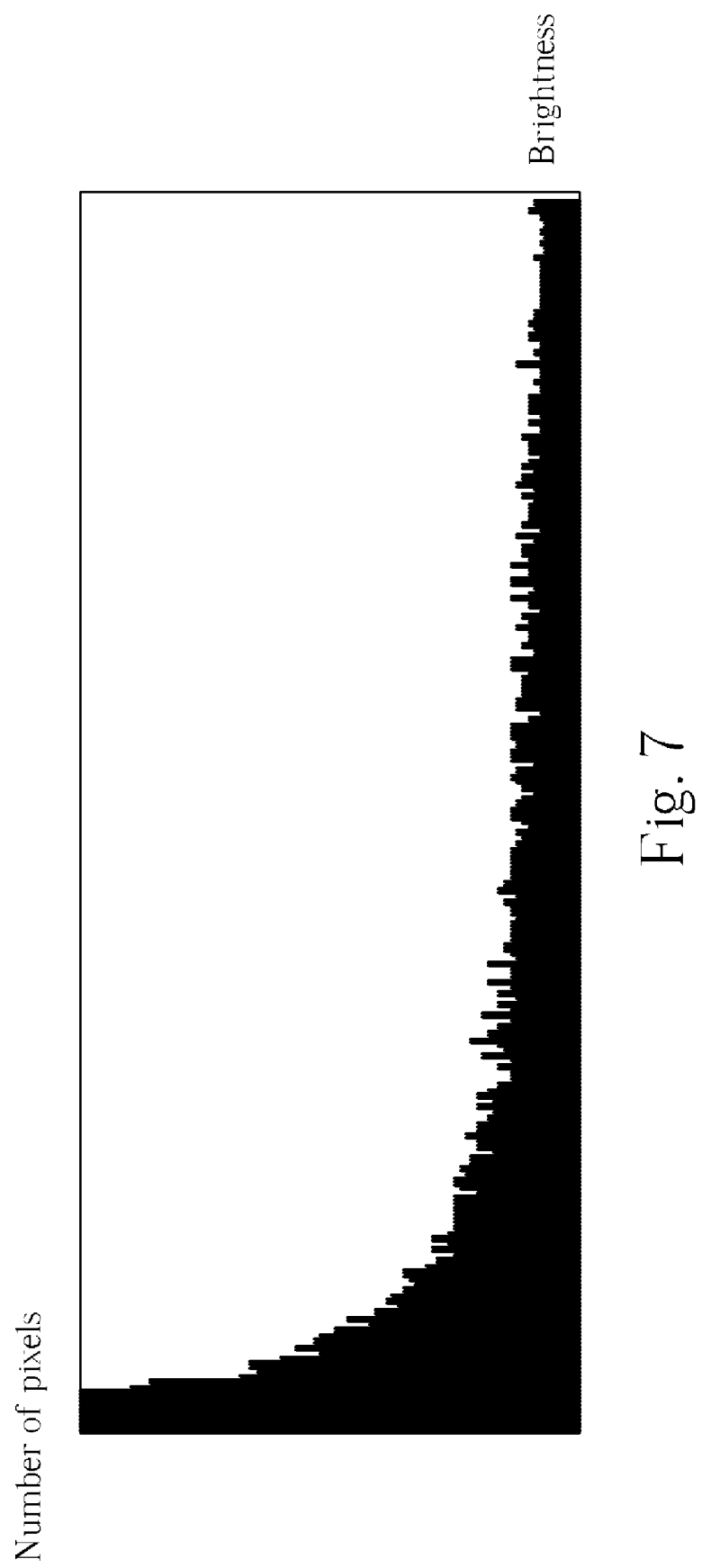
FIG. 7 is a brightness distribution of an image.

Assuming a brightness distribution compiled by the brightness accumulating memory unit 54, shown in FIG. 7, is divided into 8 brightness regions and the resulting brightness distribution is compared by the brightness comparator 12. A following equation can determine if the resulting brightness distribution matches one of the predetermined brightness distributions:

$$D \geq \sum_{i=1}^{n} |A - B|;$$

wherein:

D is a predetermined offset;

A is a number of pixels in an $i^{th}$ brightness region of the resulting brightness distribution;

B is a number of pixels corresponding to the $i^{th}$ brightness region of the predetermined brightness distribution; and n is a number of brightness regions (n=8 in this example).

Figure 3:
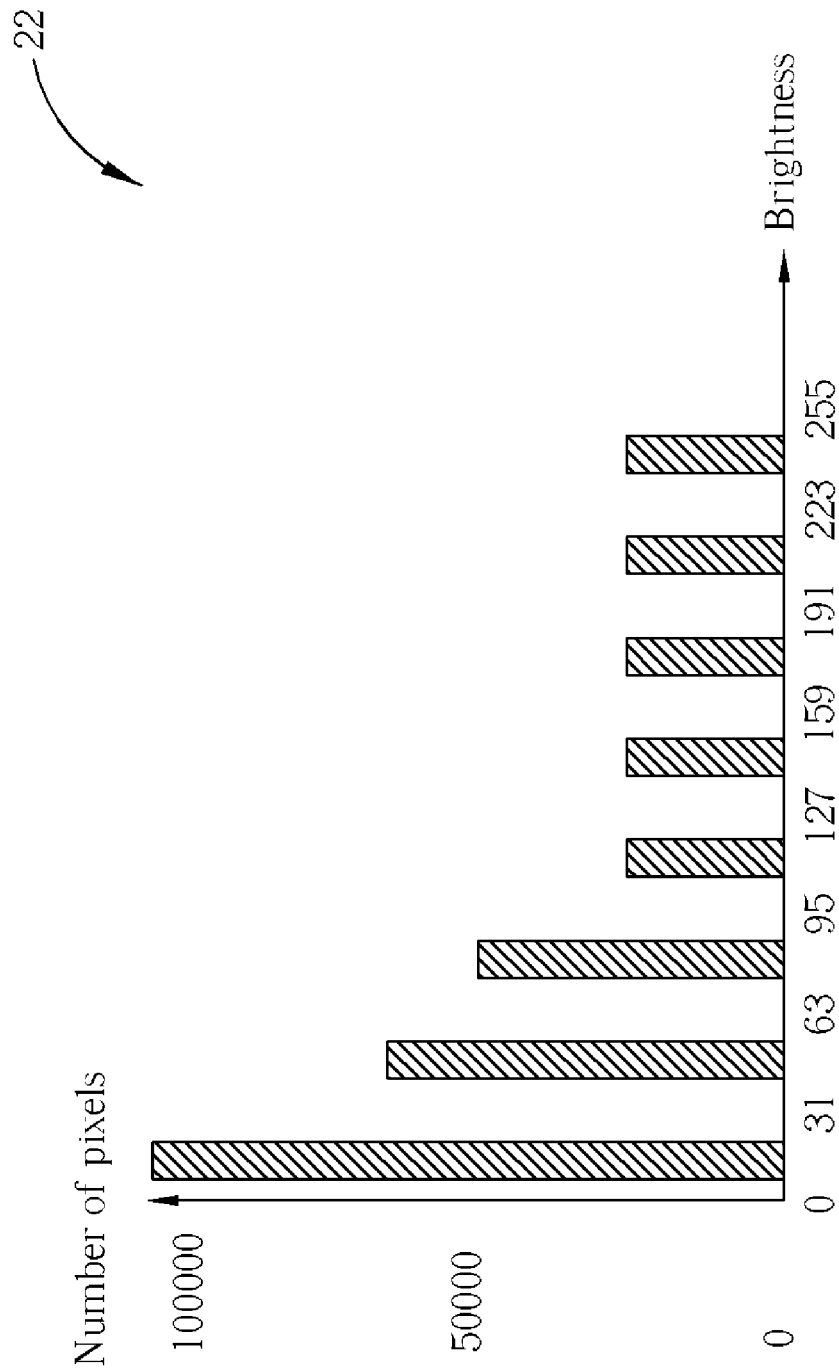
FIG. 3 to FIG. 6 are predetermined brightness distributions.
Figure 4:
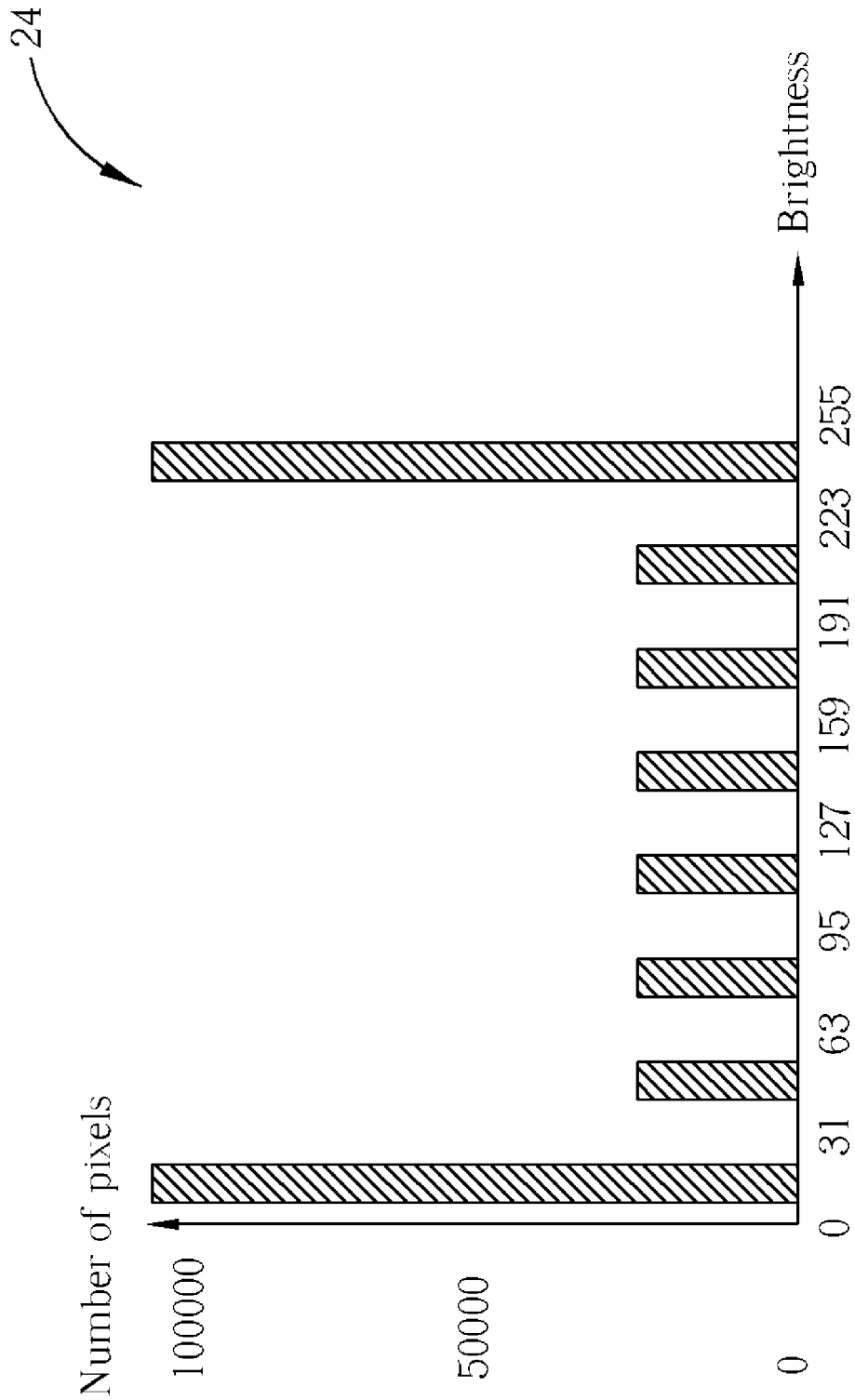
Figure 5:
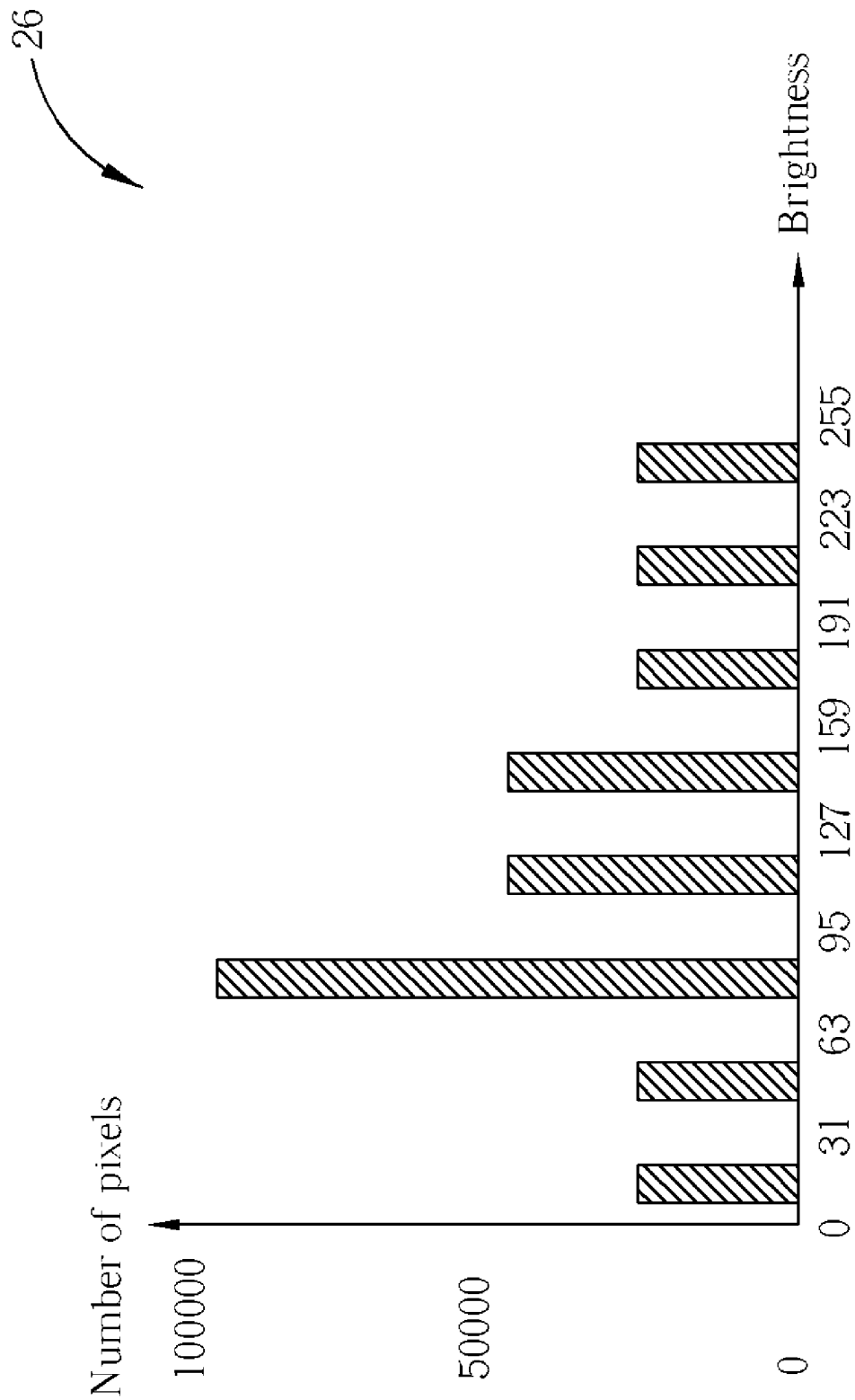
Figure 6:
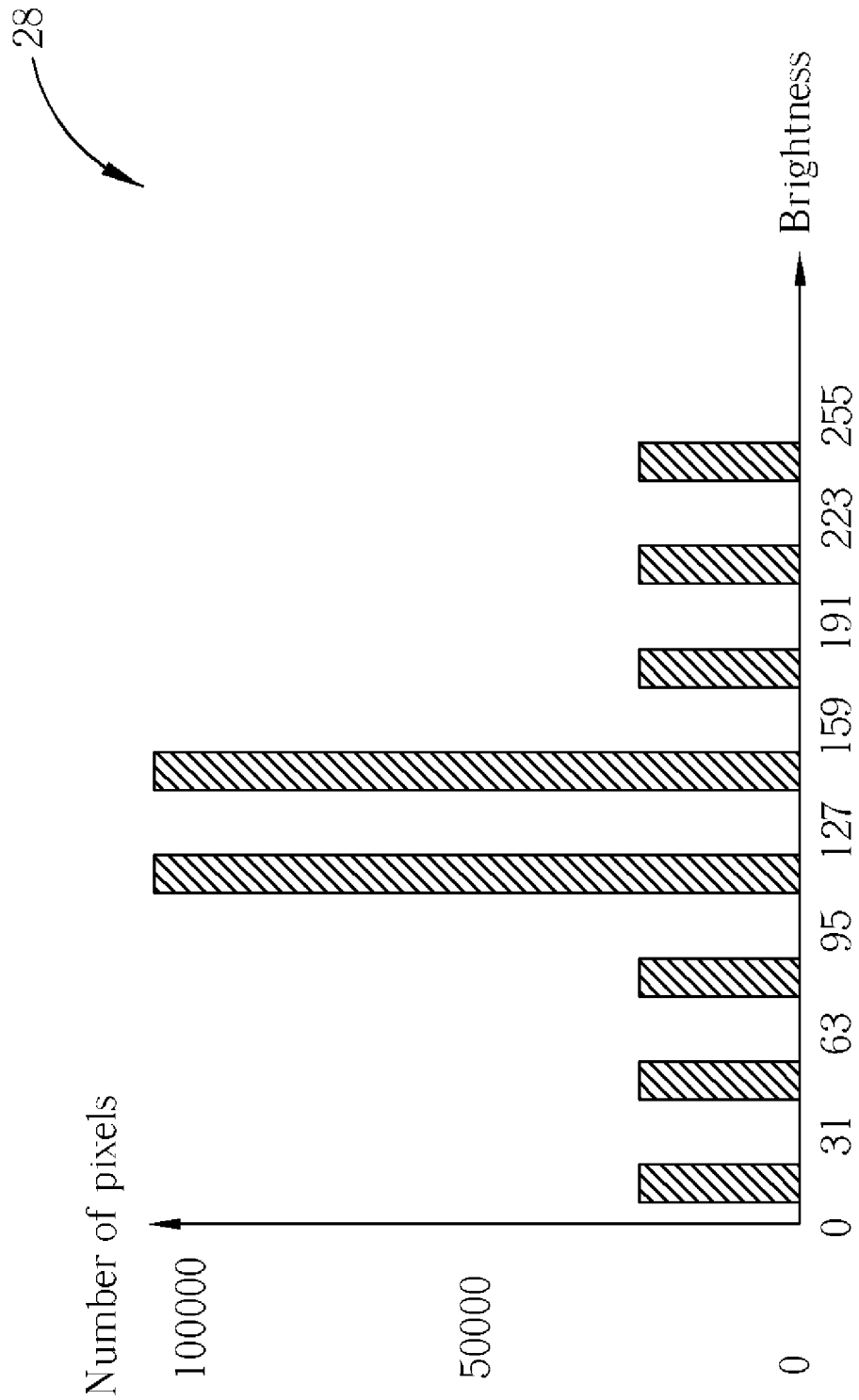

In this embodiment, the brightness distribution of FIG. 7 is similar to the brightness distribution 22 in FIG. 3. Hence the brightness comparator 12 transmits a control signal and notifies the brightness gain unit 14 to select the corresponding brightness adjustment parameter 32, so that pixels of image frames received later are adjusted to correct brightness values.

Figure 8:
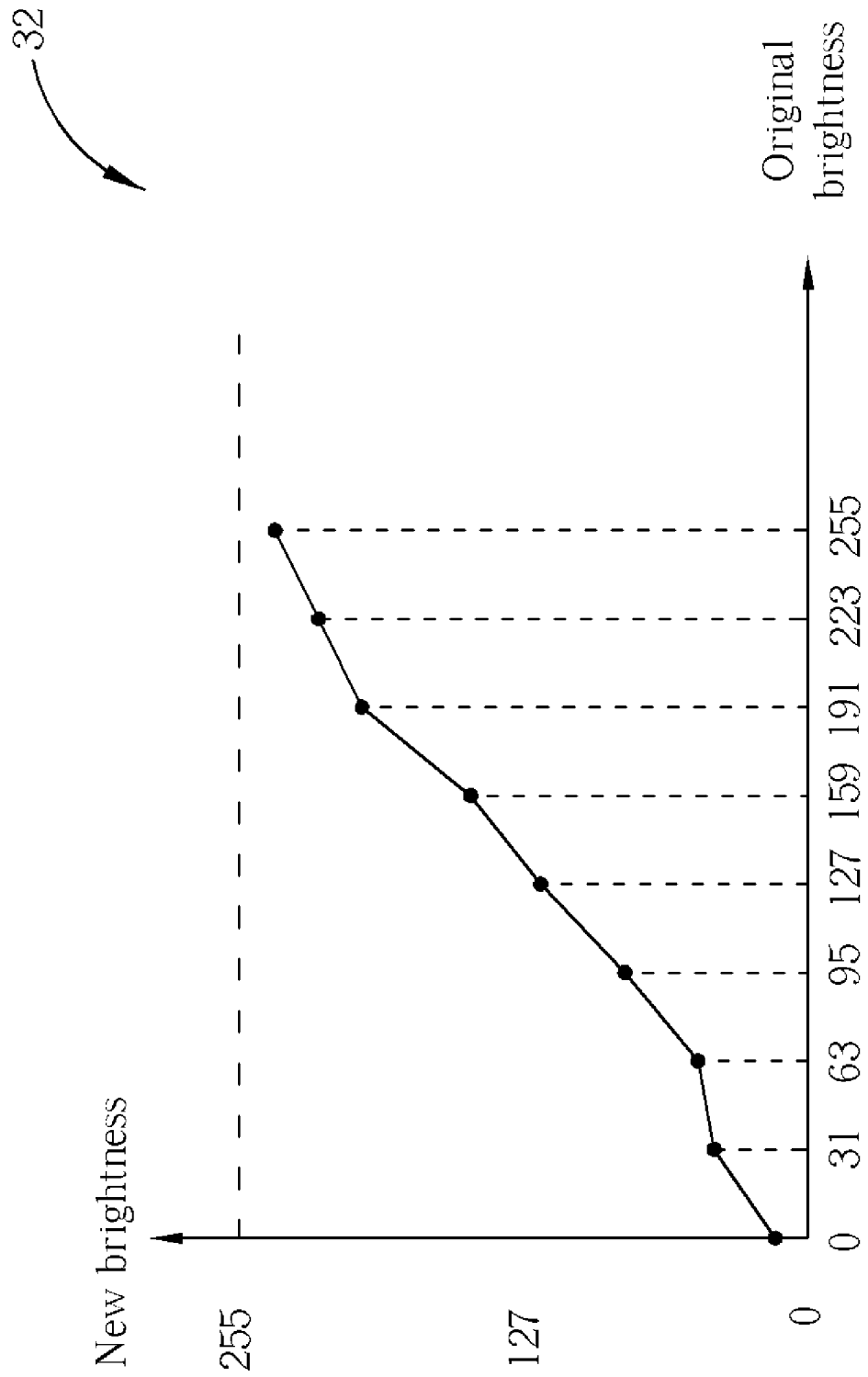
FIG. 8 is a graph of a brightness adjustment function.

Please refer to FIG. 8. FIG. 8 is a graph of the brightness adjustment parameters, where a horizontal axis represents original brightness values and a vertical axis represents new brightness values. Since the predetermined brightness distributions 22, 24, 26, and 28 are divided into 8 brightness regions, the brightness adjustment parameter 32 has 9 nodes and a new value is calculated for each brightness region by use of a function. Each point between successive nodes determines a degree of brightness adjustment; therefore, each brightness region can be adjusted by a different degree. For instance, a larger slope between two nodes represents a range of brightness values should be increased from the original brightness regions.

Figure 9:
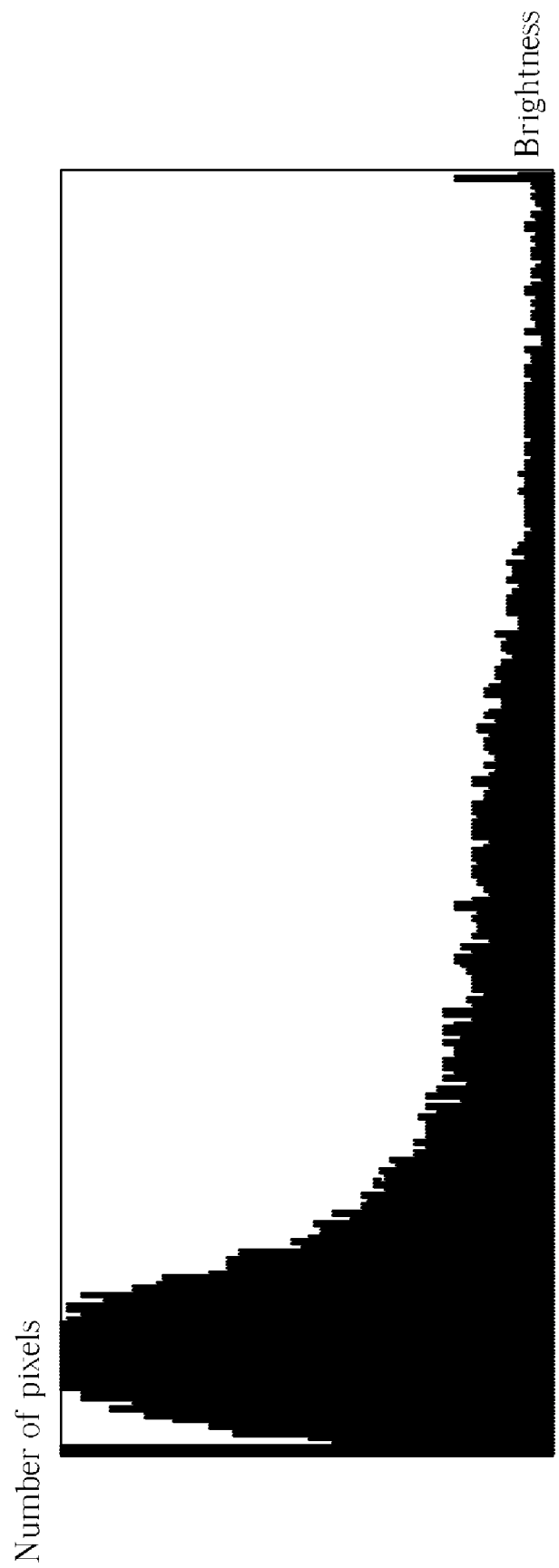
FIG. 9 is the brightness distribution in FIG. 7 after being adjusted with the brightness adjustment function of FIG. 8.

Please refer to FIG. 9. FIG. 9 is the brightness distribution of FIG. 7 after being adjusted with the brightness adjustment parameters 32. In comparison with the original brightness distribution in FIG. 7, the brightness distribution in FIG. 9 exhibits higher brightness values in the brightness regions that the brightness distribution is concentrated in.

Figure 10:
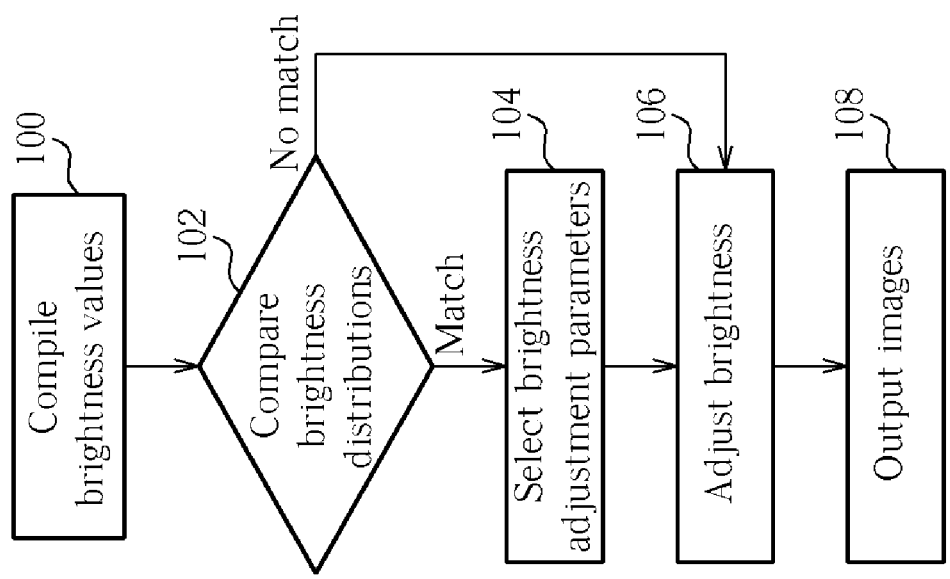
FIG. 10 is a flowchart of a method of image processing according to the present invention.

Please refer to FIG. 10. FIG. 10 is a flowchart of procedures for image processing in the present invention. Steps are:

Step 100: the brightness accumulating memory unit 54 collects data on brightness values for all pixels of an image frame to form a collected brightness distribution.

Step 102: the brightness comparator 12 compares the collected brightness distribution with the predetermined brightness distributions. If the collected brightness distribution matches one of the predetermined brightness distributions 22, 24, 26, and 28, go to step 104; else, go to step 106.

Step 104: the brightness gain unit 14 selects the corresponding brightness adjustment function 32, 34, 36, and 38 according to a control signal sent by the brightness comparator 12.

Step 106: adjust brightness values of pixels for all following image frames.

Step 108: output image frames.

In step 106, brightness values of pixels are adjusted differently based on different results of the comparison in step 102. If no matching brightness distribution is found, then the brightness of pixels is not adjusted, or is adjusted according to a brightness adjustment function previously selected. If a matching brightness distribution is found, then the brightness of pixels is adjusted according to a brightness adjustment parameter selected as described in step 104.

In the present invention, the predetermined brightness distributions 22, 24, 26, and 28 and the brightness adjustment functions 32, 34, 36, and 38 are stored in a static random access memory (SRAM) to provide a higher data collection and comparison efficiency.

The present invention is not limited to the embodiment described above. A number of the predetermined brightness distributions, a number of brightness regions in the predetermined brightness distributions, characteristics of the predetermined brightness distributions, a method of determining whether the brightness distribution of the image frame is similar to the predetermined brightness distributions, a number of image frames collected, and a method of brightness adjustment can all be adjusted for different design requirements.

For example, 8 predetermined brightness distributions and 16 brightness regions could be defined, and lookup tables could be used to set brightness adjustment values.

The present invention compares a brightness distribution of an image with predetermined brightness distributions, and a brightness adjustment function or a lookup table is selected according to the result yielded from the comparison, hence image contrast increases.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing brightness of an image comprising:

generating a plurality of predetermined brightness distributions each comprising a number of pixels whose brightness value is within each of a plurality of predetermined brightness intervals;

generating a brightness distribution of a plurality of pixels of the image according to brightness values of the pixels;

a brightness comparator comparing the brightness distribution of the pixels with each of the predetermined brightness distributions for determining whether a difference between the brightness distribution of the pixels and one of the predetermined brightness distributions is within a predetermined range; and when the difference between the brightness distribution of the pixels and the one of the predetermined brightness distributions is within the predetermined range, a brightness gain unit adjusting brightness values of upcoming pixels according to a transformation rule corresponding to the one of the predetermined brightness distribution.

2. The method of claim 1 wherein generating the brightness distribution of the plurality of pixels according to the brightness values of the pixels comprises calculating a number of pixels whose brightness value is within a predetermined brightness interval.

3. The method of claim 2 wherein determining whether the difference between the brightness distribution of the pixels and the predetermined brightness distributions is within the predetermined range comprises:

determining whether the difference between the brightness distribution of the pixels and the one of the predetermined brightness distributions is within a predetermined range according to an equation $$D \geq \sum_{i=1}^{n} |A - B|; \text{ wherein}$$

D is the predetermined range;

A is number of brightness values within an interval i of the brightness distribution of the pixels;

B is value of the one of the predetermined brightness distribution corresponding to the interval i; and n is number of the intervals of the brightness distribution.

4. The method of claim 1 wherein adjusting the brightness values of the upcoming pixels according to the transformation rule comprises using a transformation function to transform the brightness values of the upcoming pixels.

5. The method of claim 1 wherein adjusting the brightness values of the upcoming pixels according to the transformation rule comprises adjusting the brightness values of the upcoming pixels according to a look-up table.

6. The method of claim 1 wherein generating the brightness distribution of the pixels comprises collecting data on brightness values of a plurality of pixels of an image.

7. The method of claim 1 wherein generating the brightness distribution of the pixels comprises collecting data on brightness values of pixels of a plurality of images.

8. An image processor for adjusting a brightness of images, the image processor comprising:

a brightness comparator for comparing a brightness distribution of a plurality of pixels with each of a plurality of predetermined brightness distributions; and a brightness gain unit for adjusting gains of brightness values of pixels of an upcoming image according to a transformation rule corresponding to one of the predetermined brightness distributions with which the brightness distribution of the pixels compares;

wherein the brightness distribution of the plurality of pixels comprises a number of pixels whose brightness value is within each of a plurality of predetermined brightness intervals.

9. The image processor of claim 8 further comprising a brightness accumulation memory unit for accumulating brightness values of the pixels.

10. The image processor of claim 9 further comprising a timing accumulation memory unit for controlling the brightness accumulation memory unit to accumulate the brightness values of the pixels.

11. The image processor of claim 8 further comprising a static random access memory (SRAM) for storing the predetermined brightness distributions.

12. The image processor of claim 8 further comprising a static random access memory (SRAM) for storing the transformation rule.

* * * * *